Figure 1:
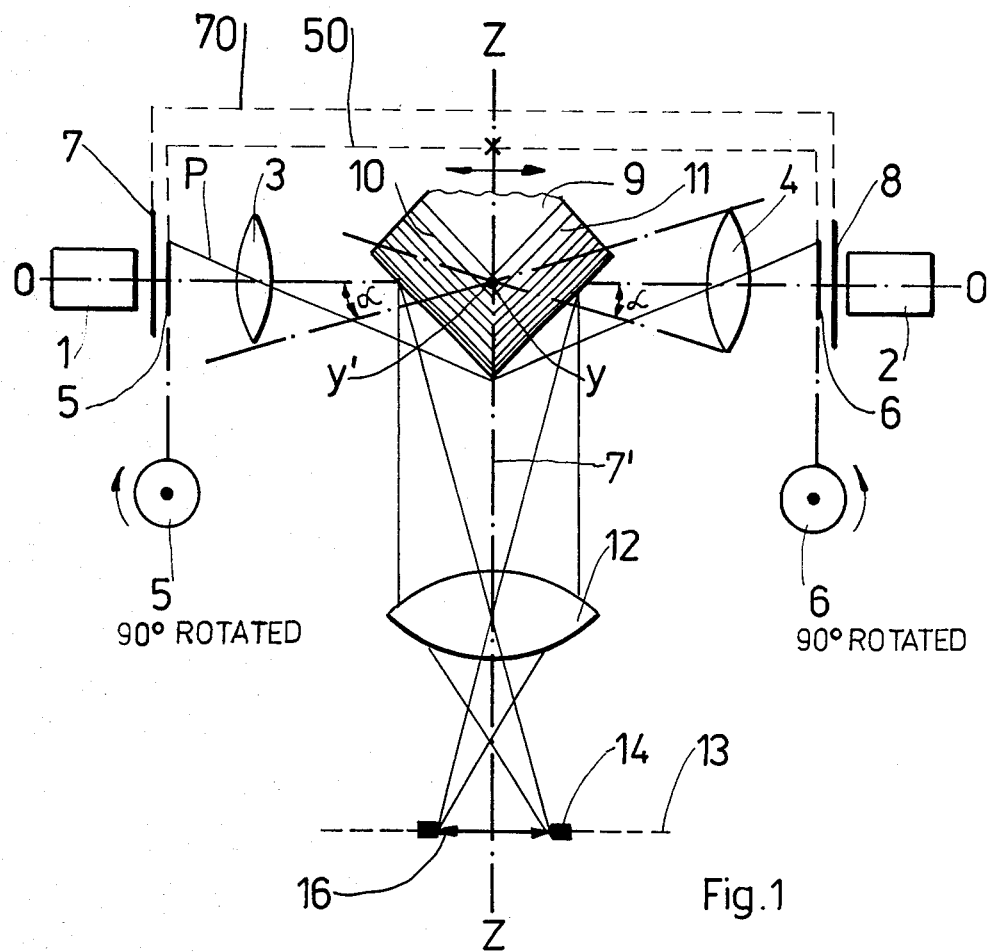

United States Patent [19]

Kühn

[11] Patent Number: 4,634,387

[45] Date of Patent: Jan. 6, 1987

[54] DEVICE FOR SIMULATING THE MOVEMENTS OF AND REPRESENTING ROTATION SYMMETRICAL BODIES

[76] Inventor: Gebhard Kühn, 9, Werner-Seelenbinder-Str., Jena-Lobeda, German Democratic Rep.

[21] Appl. No.: 772,503

[22] Filed: Sep. 4, 1985

[30] Foreign Application Priority Data

Oct. 1, 1984 [DD] German Democratic Rep. .................................. 2678028

[51] Int. Cl.$^4$ ........................................... G09B 27/00
[52] U.S. Cl. .................................................... 434/291
[58] Field of Search .............. 434/284, 285, 286, 289, 434/290, 291, 292

[56] References Cited

U.S. PATENT DOCUMENTS 4,020,568  5/1977  Tajima et al. .................... 434/286

FOREIGN PATENT DOCUMENTS 202959  10/1983  German Democratic Rep. .
214959  10/1984  German Democratic Rep. .

Primary Examiner—William H. Grieb

[57] ABSTRACT

A device for simulating the movements of and representing rotation symmetrical bodies, such as planets, particularly for use in planetaria, comprising a reflecting member centrally inserted between two illumination systems. The reflecting member is provided with two reflecting faces carrying a step arrangement and including an angle of 90° with one another. Each of the reflecting faces includes an angle of 45° with an optical axis and lies in an intermediate plane into which slide photos of bodies to be reproduced are imaged. The reflecting member is displaceably and tiltably arranged and is followed by an image fusing lens. Furthermore, adjacent to the slide photos occulting members are provided.

8 Claims, 7 Drawing Figures

DEVICE FOR SIMULATING THE MOVEMENTS OF AND REPRESENTING ROTATION SYMMETRICAL BODIES

The invention relates to a device for simulating the movements of and representing rotation symmetrical bodies, such as planets, and is particular for use in planetaria or other projection devices.

Phase projectors as used in planetaria comprise an illumination system for illuminating a slide photo of the body to be reproduced, an imaging optical lens for imaging said body into an intermediate image plane in which an occulting member composed of calottes is arranged, and a projection lens for projecting the intermediate image plane onto the dome of a planetarium. The calottes which are rotatable about an axis occult a part of the path of rays in the course of simulating the phases of the planets.

In the DD-PS No. 202959 an arrangement is disclosed in which two calottes are disposed one above the other and in mutually displaced relation by 180° about one axis along which the calottes may be displaced by a switch-over member. Furthermore, the DD WP G 09 B 249920 discloses a device including an inversion prism and phase mechanism of the diaphragm type in which the diaphragm leaves which produce the different phases are imaged into the intermediate image plane of the phase projector. In the U.S. Pat. No. 4,020,568 two elements which produce the phases are provided at right angles to one another in the path of rays of a moon projector. The devices mentioned hereinbefore are disadvantages in that the different phases to be simulated are only incompletely produced or additional optical or mechanical means have to be provided.

None of said arrangements permit a view of the pole (libration) of the celestial body to be represented.

It is an object of the present invention to obviate the above disadvantages.

It is a further object of the present invention to provide a device which permits a natural representation of bodies with low technical expenditures.

It is still a further object of the present invention to provide a device for representing celestial bodies such as planets, sun and moon etc. which permits to represent different selected phases and pole views of a rotating sphere.

In accordance with the present invention there is provided a projection device for representing rotation symmetrical bodies, such as planets, under use of slides showing the bodies to be represented comprising a light source, a condenser lens and an imaging optical system for imaging the photo slides into an intermediate image plane, characterized in that centrally arranged between two opposing illumination systems and associated imaging system a reflecting member is provided with at least two stepped reflecting faces which include an angle of 90° with one another. Preferably, each of said reflecting faces includes an angle of 45° with the optical axis of the imaging systems and is arranged in the intermediate image plane of the imaging system to which it is associated. Both reflecting stepped faces have a plane of symmetry in which they are contiguous.

The reflecting member is displaceable along the optical axis of the imaging system. Furthermore, the reflecting member is rotatable about a perpendicular axis which is at right angles to the optical axis and passes the interception point of the optical axis with the plane of symmetry. The reflecting member is followed by an imaging objective lens for imaging the intermediate image planes of the imaging systems into an image plane for image fusion.

Advantageously, a circular hole aperture is provided in said image plane.

Furthermore, occulting discs having one straight line limitation each are disposed adjacent the photo slides in a parallel plane to the latter. Said discs are insertable into the respective path of rays up to the optical axis and rotatable about the latter.

Preferably, the reflecting member is made of metal, glass or synthetic material, the stepped reflecting faces being manufactured in a cutting or non-cutting procedure.

It is a further advantage when the reflecting member is composed of a plurality of glass planes cemented to a stepped arrangement.

A particular advantageous embodiment of the reflecting member is obtained when the curve enveloping the steps of the reflecting member, considered in a normal section, is an ellipse having a major axis a and a minor axis $$b = \frac{a}{2\sqrt{2}},$$

where a is also the diameter of the intermediate image on the reflecting member. The photo slides are arranged in the illumination path of rays synchronously rotatable about the optical axis.

The photo slides exhibit pole views of the body to be represented.

The device ensures a natural representation of the body to be reproduced, for example, of a rotating symmetrical body on the dome of a planetarium with a comparatively simple technical construction.

When the photo slides synchronously rotate about the optical axis of the illumination systems then a rotating image of the body to be reproduced results in the plane of the circular hole aperture.

When the reflecting member is displaced in direction of the optical axis of the imaging systems, the axis of rotation of the body to be reproduced moves out the drawing plane and the image of the body shows the ranges in the vicinity of the poles moving like in nature about a point (pole).

The fusion line of both semi-images of the photo sildes composed in the plane of the circular hole aperture remains a straight line.

In contrast to the previous art devices the present invention permits to represent views of the pole (libration) of a planet on the dome of a planetarium. By rotating the reflecting member about the perpendicular axis a rotation of the pole regions is effected when the photo slides are rotated. In addition thereto a natural curvature of the parallels of latitude and of the equator of the body reproduced can be simulated. The three-dimensional impression of the representation is improved. Phase positions of celestial bodies when reproduced can be obtained in a simple manner by the rotation of the occulting discs, inserted before or after the photo slides, about the optical axis.

Figure 2:
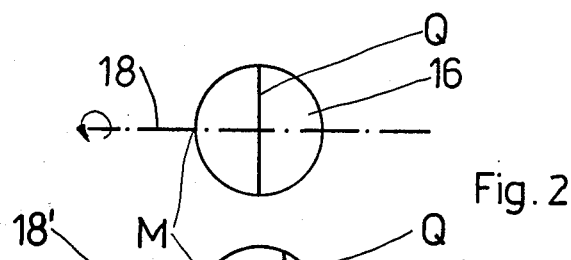
Figure 3:
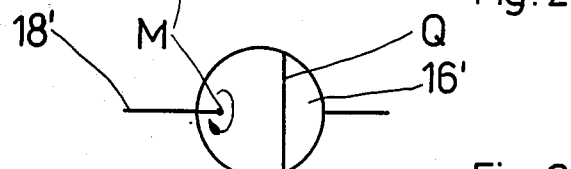
Figure 4:
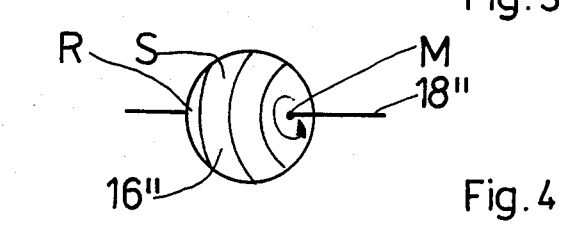
Figures 5, 6, 7:
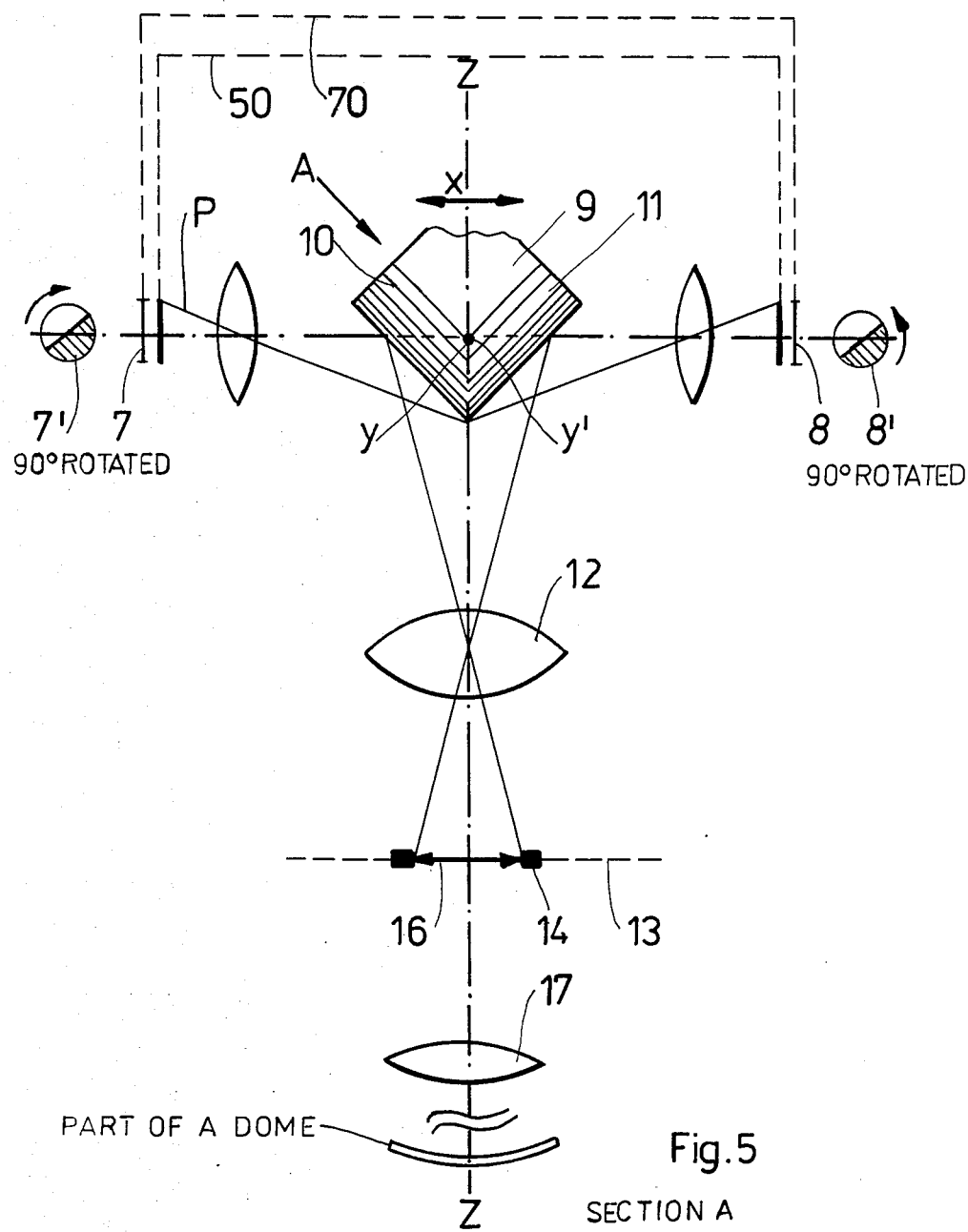

In order that the invention may be more readily understood reference is made to the accompanying drawings which illustrate diagrammatically and by way of example two embodiments thereof and where FIG. 1 is schematic view of a device for representing views of rotation symmetrical bodies including a reflecting member having two reflecting stepped faces including an angle of 90° with one another, FIGS. 2, 3 and 4 show schematic views of images of a reproduced body in the plane of a hole aperture of the device of FIG. 1, FIG. 5 a schematic view of a device for representing phases of a celestial body, FIG. 6 a schematic view of a phase of a body in the plane of a hole aperture of FIG. 5, and FIG. 7 a perpendicular schematic and sectional view of the reflecting member of FIG. 5 considered in direction of an arrow A.

In FIG. 1 the optical system of a device for representing and simulating the movements of a celestial body comprises about an optical axis 0—0 a first and a second illumination system 1 and 2, the one being followed by an imaging system 3 and the other by an imaging system 4. A reflecting member 9 is inserted between the imaging systems 3 and 4. A photo slide 5 is disposed in the image plane of a condenser lens (not shown) of the illumination system 1 and an occulting disc 7 adjacent to said photo slide 5. A photo slide 6 and an adjacently located occulting disc 8 are provided in the image plane of a condenser lens (not shown) of the illumination system 2. The occulting discs 7 and 8 are connected with one another via means 70 for effecting common rotation of the former about the optical axis 0—0. In an similar manner, the photo slides 5 and 6 are connected with one another via means 5 also for rotation about the optical axis 0—0. The photo slides 5 and 6 show pole views of a body to be represented. The occulting discs 7 and 8 only cover the path of rays P to a half as can be seen in FIG. 5 where the occulting discs 7 and 8 of FIG. 1 are represented as lying in the drawing plane and are designated 7' and 8', the shaded portions of the latter indicate the occulting, the non-shaded portions the transmissive range of the discs 7' and 8'. The reflecting member 9 is centrally arranged between the imaging systems 3 and 4 about the optical axis. The reflection member 9 is composed of two reflecting faces 10 and 11 which are in opposition to the respective imaging systems 3 and 4 and include an angle of 45° with the latter in rest position. The two faces 10 and 11 include an angle of 90° with one another.

Each of the reflecting faces 10 and 11 is constituted of an arrangement of steps as can be seen in the section A of FIG. 7. The step portions 10' which are in opposition to the imaging system 3 are reflective. The not visible step portions 10' of the face 11 are reflective, too. The reflecting face 10 is located in an intermediate image plane of the imaging system 3, and the reflecting face 11 in an intermediate image plane of the imaging system 4. The reflecting faces 10 and 11 of the member 9 are contiguous in a plane of symmetry z' which includes an axis Z. The latter lies in the drawing plane and is at right angles to the optical axis 0—0 which it intercepts in Y. The section A of FIG. 7 shows a curve 15 which envelops the steps of the reflecting member 9. Said curve is an ellipse having a major axis a and a minor axis b where $$b = \frac{a}{2\sqrt{2}}.$$

a is the diameter of the intermediate images of the slide photos 5 and 6, respectively, in the respective intermediate planes constituted by the reflecting faces 10 and 11, respectively.

As indicated by the double arrow X, the reflecting member 9 is displaceable along the optical axis 0—0. Furthermore, the reflecting member 9 is rotatable about an axis Y' which is at right angles to the drawing plane and passes the point of interception Y. In the plane of symmetry Z' and about the axis Z an objective lens 12 is arranged subsequent to the reflecting member 9. The objective lens 12 images the intermediate images of the photo slides 5 and 6, respectively, produced on the respective reflecting faces 10 and 11 into an image plane 13 where both intermediate images are fused. In the image plane 13 a hole aperture 14 is disposed in which a fused image 16 of the body, for example, a planet, to be represented and originating from the two photo slides 5 and 6 is produced. A projection lens 17 (FIG. 5) projects the image 16 onto a dome of a planetarium (not shown). When the photo slides 5 and 6 are synchronously rotated via the means 50 then the image of a rotating sphere results in the image plane 13, as shown in FIG. 2. When the reflecting member 9 is displaced in X-direction along the optical axis 0—0, an axis of rotation 18 of the image 16 is tilted out of the drawing plane as shown in FIG. 3 so that the ranges in the vicinity of the pole of the body to be represented naturally move about the pole M. The fusion line of both images of the photo slides 5 and 6 (FIG. 1) is still a straight line Q, (FIGS. 2 and 3). It is also feasible to tilt the reflection member 9 about the axis Y about an angle α (FIG. 1) in addition to or instead of the displacement along the optical axis 0—0 (X-direction). Thereby, a rotation of the ranges in the vicinity of the pole M about the latter is obtained and a correct curvature and bent, respectively, in the entire image 16" of the parallels of latitude is the result as shown in FIG. 4. The fusion line S, the equator, of the two fused semiimages (photo slides 5 and 6) is also curved as in nature. The simulation of the phases such as the moon phases is effected by the operation of the occulting discs 7 and 8 which are adjacently located to the photo slides 5 and 6 (FIGS. 1 and 5). The discs 7 and 8 are synchronously rotated via the means 70 and are inserted into the path of rays P up to the optical axis 0—0 (FIG. 5).

FIG. 6 shows an imaging of the phases, where a shaded area 19 is produced by the shaded portions 7' and 8' of the occulting discs 7 and 8, respectively.

The reflecting member 9 is made of metal, glass or synthetic material, the individual steps being produced either by cutting or non-cutting procedures.

It is also feasible to produce th reflecting member 9 by cementing a plurality of glass panes in such a manner to yield a stepped arrangement. The means 70 and 50 are any suitable means to effect synchronous rotation of the occulting discs 7, 8 and of the slides 5, 6, respectively. The displacement means for displacing the reflecting member 9 is, for example, a sliding bar connected to the former in a respective guide. The movements are obtained by servo-motors or any other suitable means.

I claim:

1. A device for simulating the movements of and representing rotation symmetrical bodies, such as planets, particularly for use in projection devices and planetaria, comprising about a first optical axis, a first optical unit,
a second optical unit, a reflecting member being arranged between said first optical unit and said second optical unit, said first optical unit being constituted, subsequently and in direction of said reflecting member, of a first illumination system,
a first occulting means,
a first photo slide,
and a first imaging lens, said second optical unit being constituted, subsequently and in direction of said reflecting member, of a second illumination system,
a second occulting means,
a second photo slide, and
a second imaging lens, said reflecting member having a first reflecting face in opposition to said first imaging system and a second reflecting face in opposition to said second imaging system, said first and said second reflecting face including an angle of 90° to one another and being symmetrical to a common plane of symmetry being at right angles to said first optical axis, when said reflecting member being in an initial position, said first and said second reflecting face being contiguous in said plane of symmetry and including an angle of 45° with said first optical axis, said first and said second reflecting face being provided with a step arrangement, and being arranged in intermediate image planes of said first and said second imaging system, respectively, an axis of rotation being provided perpendicular to said first optical axis and intercepting the latter in said plane of symmetry, a second optical axis being at right angles to said axis of rotation and to said first optical axis, a third imaging lens being arranged about said second optical axis, said third imaging lens having an image plane, a circular aperture being arranged in said image plane, projection means being for projecting said image plane onto a projection screen, said first and said second illumination systems illuminating said first and said second photo slides, said first and said second imaging system imaging said first and said second photo slide, respectively, upon said first and said second reflecting face, said third imaging lens imaging the intermediate images of said first and said second photo slides from said first and said second reflecting face, respectively, into said circular aperture.

2. A device as claimed in claim 1, wherein said first and said second occulting discs have a straight line limitation each and are rotatable about said optical axis,
said first and said second occulting discs being insertable into an illumination path of beams up to the optical axis.

3. A device as claimed in claim 2, wherein said reflecting member is displaceable along the first optical axis and tiltable about said axis of rotation, respectively.

4. A device as claimed in claim 3, wherein said first and said second photo slides represent photos of celestial bodies to be represented and wherein said first and said second photo slides are synchronously rotatable about said optical axis in said illumination path of beams.

5. A device as claimed in claim 4, wherein said first and said second photo slides of celestial bodies show pole views of the latter.

6. A device as claimed in claim 5, wherein an enveloping curve resulting from a normal section through said reflecting member and enveloping the step arrangement is an ellipse having a major axis a and a minor axis b, where $$b = \frac{a}{2\sqrt{2}}$$

and a is also the diameter of the intermediate planes on said first and said second reflecting face, respectively.

7. A device as claimed in claim 6, wherein said reflecting member is made of any suitable material such as metal, glass and synthetics, respectively, the reflecting faces being manufactured by a cutting and a non-cutting procedure, respectively.

8. A device as claimed in claim 6, wherein said reflecting member is composed of a plurality of glass panes being cemented to a step arrangement.

* * * * *